United States Patent
Allen et al.

(10) Patent No.: US 10,055,473 B2
(45) Date of Patent: Aug. 21, 2018

(54) SYSTEMS FOR ALLOWING ANNOTATION IN REAL TIME

(71) Applicant: Core-Apps, LLC, Arnold, MD (US)

(72) Inventors: Robert Allen, London (GB); David Dekker, London (GB); Christopher Mccormack, Newbury (GB)

(73) Assignee: Core-Apps, LLC, Arnold, MD (US)

( * ) Notice: Subject to any disclaimer, the term of this patent is extended or adjusted under 35 U.S.C. 154(b) by 324 days.

(21) Appl. No.: 14/935,786

(22) Filed: Nov. 9, 2015

(65) Prior Publication Data

US 2016/0132578 A1 May 12, 2016

Related U.S. Application Data

(60) Provisional application No. 62/077,006, filed on Nov. 7, 2014.

(51) Int. Cl.
| | |
|---|---|
| *G06F 15/16* | (2006.01) |
| *G06F 17/30* | (2006.01) |
| *H04L 29/06* | (2006.01) |
| *H04L 29/08* | (2006.01) |
| *H04L 12/44* | (2006.01) |
| *H04W 84/18* | (2009.01) |
| *H04L 12/703* | (2013.01) |
| *H04L 12/707* | (2013.01) |
| *G06F 15/173* | (2006.01) |

(52) U.S. Cl.
CPC .. *G06F 17/30575* (2013.01); *G06F 15/17325* (2013.01); *H04L 12/44* (2013.01); *H04L 45/22* (2013.01); *H04L 45/28* (2013.01); *H04L 67/26* (2013.01); *H04L 67/42* (2013.01); *H04W 84/18* (2013.01)

(58) Field of Classification Search
USPC .................. 709/203, 206; 370/254, 328, 312
See application file for complete search history.

(56) References Cited

U.S. PATENT DOCUMENTS

| | | | |
|---|---|---|---|
| 7,277,950 B1 | 10/2007 | Chapweske | |
| 7,337,389 B1 * | 2/2008 | Woolf | G06F 17/241 345/629 |
| 7,373,590 B2 | 5/2008 | Woolf et al. | |
| 7,710,986 B2 * | 5/2010 | Zeng | H04L 12/189 370/312 |

(Continued)

OTHER PUBLICATIONS

Extended European Search Report EP15193758.8 dated May 16, 2016 (9 pages).

*Primary Examiner* — Tammy Nguyen
(74) *Attorney, Agent, or Firm* — Polsinelli PC; Adam C. Rehm

(57) ABSTRACT

Synchronous content sharing of media assets via an object data model propagated through a star network or a mesh network. Each user device updates a local object data model including information on the status of the media asset delivery, to achieve synchronization with the source data. Updates to the local object data model may be the result of direct connection between a user device and an application server via a network, or the result of indirect connections through peers in mesh networks, where the local object data model is shared through hops between peers in the mesh network if the direct connection is unavailable.

17 Claims, 11 Drawing Sheets

(56) References Cited

U.S. PATENT DOCUMENTS

| | | | |
|---|---|---|---|
| 7,779,347 B2 * | 8/2010 | Christiansen | G06F 17/241 715/230 |
| 7,796,190 B2 | 9/2010 | Basso et al. | |
| 8,027,272 B2 * | 9/2011 | Ramachandran | H04W 24/04 370/254 |
| 8,189,536 B2 * | 5/2012 | Kapur | H04W 40/26 370/328 |
| 8,239,455 B2 | 8/2012 | Wang | |
| 8,296,366 B2 | 10/2012 | Huai | |
| 8,506,395 B2 | 8/2013 | Bytnar et al. | |
| 8,554,868 B2 | 10/2013 | Skyrm et al. | |
| 8,566,353 B2 * | 10/2013 | Fink | G06F 17/3082 707/705 |
| 8,644,220 B2 * | 2/2014 | Jing | H04L 12/2809 370/328 |
| 8,750,305 B2 | 6/2014 | Ho | |
| 8,779,266 B2 | 7/2014 | Basso et al. | |
| 8,787,820 B2 | 7/2014 | Lang et al. | |
| 8,856,252 B2 * | 10/2014 | Leppanen | G06Q 10/10 709/206 |
| 2006/0048047 A1 * | 3/2006 | Tao | G06F 17/241 715/232 |
| 2009/0217150 A1 | 8/2009 | Lin | |
| 2009/0249222 A1 | 10/2009 | Schmidt et al. | |
| 2009/0319824 A1 | 12/2009 | Liu et al. | |
| 2010/0318893 A1 | 12/2010 | Matthews et al. | |
| 2011/0307788 A1 | 12/2011 | Cheung et al. | |
| 2012/0005304 A1 | 1/2012 | Guo et al. | |
| 2012/0036423 A1 | 2/2012 | Haynes, II et al. | |
| 2012/0191781 A1 | 7/2012 | Shen et al. | |
| 2013/0038674 A1 | 2/2013 | Woods et al. | |
| 2014/0108958 A1 | 4/2014 | Toepper et al. | |

\* cited by examiner

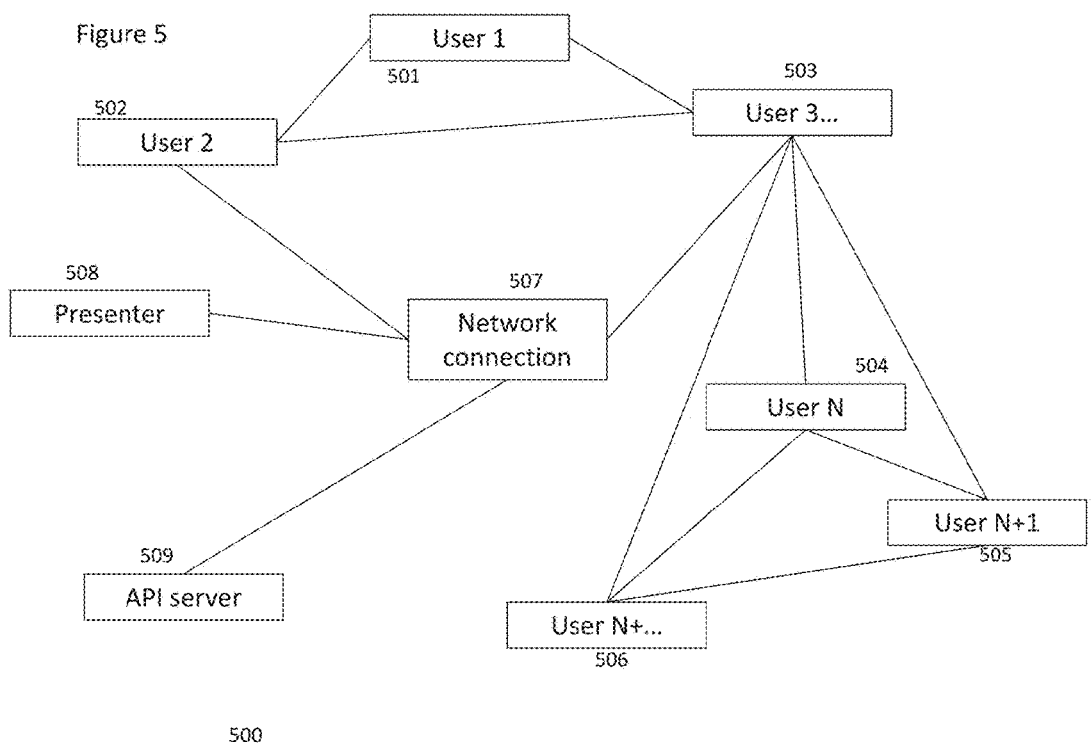

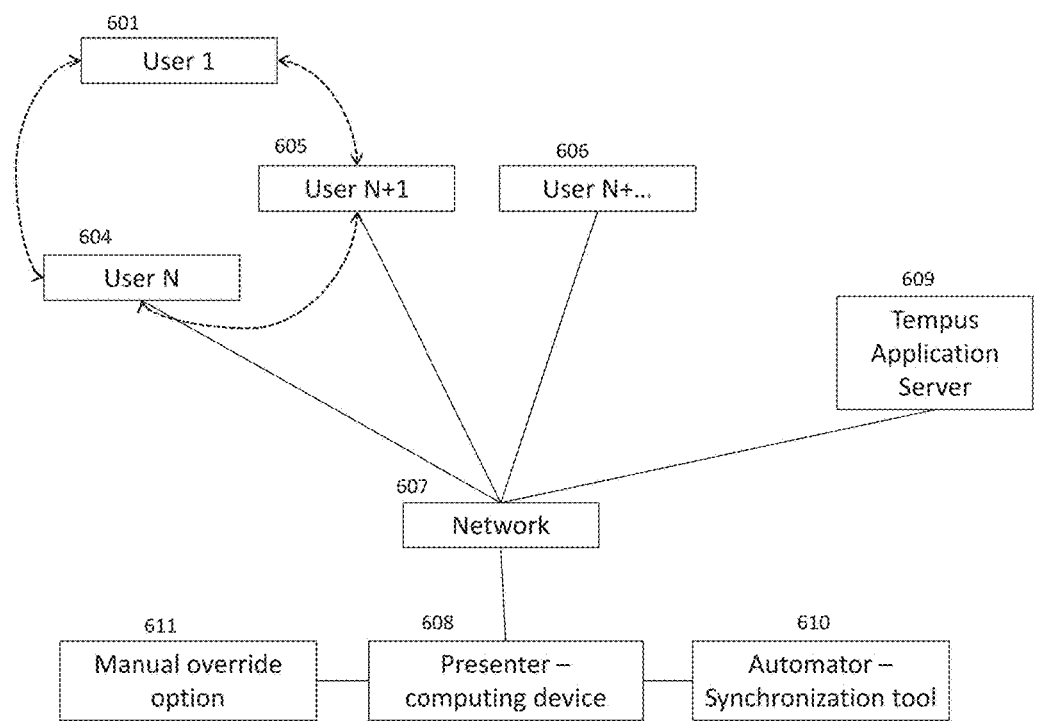

Figure 7

```
{
  "_id" : ObjectId,
  "attributes" : {
    "themeColour" : String,
    "theme" : String,
    "location" : String,
    "summary": String
  },
```
F1

```
  "automator": ObjectId,
  "conference" : ObjectId,
  "createdAt" : ISODate,
  "currentSlide" : Number,
  "day" : Number,
  "embargoedSlide" : ObjectId,
  "endTime" : String,
  "hasEnded" : Boolean,
  "hasSlides" : Boolean,
  "hasStarted" : Boolean,
  "isEmbargoed" : Boolean,
  "modifiedAt" : ISODate,
  "speaker" : String,
  "moderator": String
  "startDate" : String,
  "startTime" : String,
  "timezone" : String,
  "title" : String,
  "type" : Number
}
```
F2

SYSTEMS FOR ALLOWING ANNOTATION IN REAL TIME

CROSS-REFERENCE TO RELATED APPLICATIONS

This application claims priority to U.S. Application Ser. No. 62/077,006 filed Nov. 7, 2014, the contents being incorporated herein by reference in their entirety.

TECHNICAL FIELD

The systems and methods described herein relate to network communications. More specifically, the systems and methods described herein relate to the use of network communications to deliver information synchronously to multiple user devices.

BACKGROUND

Sharing synchronized data between users can be a complex process, particularly for computer data. The complexity in part arises from the fact that computer data files can be very large. For example, users and applications commonly want to share audio or video information, text, pictures, games or other media data. Such media data files can be quite large and distributing large data files to multiple users or applications can place unachievable demands on network bandwidth and processing resources.

For example, in a conventional star network, each user establishes a connection with a source server, creating a hub and spoke model for data transfer. U.S. Pat. No. 8,750,305, incorporated by reference in its entirety, describes a star network architecture. Users share audio and video, text and pictures, games or other media assets by transferring data from the hub and across the spokes. In operation, the hub processes requests for data files by transferring the data files to the requestor as quickly as possible. To synchronize the distribution of data, the hub needs to transfer the data to the users quickly enough to have the data appear to arrive at each user at essentially the same time. Synchronizing data among users presents a unique set of challenges, with the load on the hub network increasing at least proportionally to the number of users.

For example, in the context of a presentation or a conference, with a star network each user establishes a connection with a hub network through a Wi-Fi connection. Each user-to-server connection allows data from transfer from the network to the user, but it also takes up bandwidth and processing resources and gradually impairs the ability of other users to access or access quickly the same data. This negatively impacts certain data transfer applications, such as a streaming media, or a running slide show presentation. In the extreme, some users may be unable to access data due to an inability to connect to the server. This is particularly problematic in classroom or conference settings where participants may wish to follow a presentation in real-time to take notes or interact with colleagues.

As an alternative to star networks, mesh networks have been developed to allow devices to work together to form a mesh and to transfer data from one device to another device via other devices in the mesh network. U.S. Pat. No. 7,710,986, incorporated by reference, describes a mesh network architecture. A mesh network does away with the hub present in the star network, with each connected device in the mesh forming a node. Information can then travel through a combination of nodes, bypassing any broken links or unavailable nodes. Through a mesh device, two devices which are not directly connected can still exchange information through other devices. An example of a mesh network is the Apple Multipeer Connectivity Framework, released in iOS7, which allows nearby iOS devices to communicate with one another even in the absence of common Wi-Fi network.

Mesh networks come with their own set of challenges, including the necessity to keep track of devices available in a mesh network, despite a potentially large number of devices entering, exiting and reentering the mesh network.

As a result, devices within the mesh network frequently use a ping, the sending of a signal to other devices, to determine the number and identity of devices effectively active within the mesh network. In the absence of a response to a ping, the unresponsive device is determined to have left the mesh network, or to at least be unresponsive. As the size of the mesh increases, the transfer of data between nodes, such as sending and receiving pings increases exponentially, creating data noise which is difficult to minimize. Thus, mesh networks can become resource constrained due to the overhead needed to track nodes in the network and the current state of the nodes.

As such, there remains a need for improved systems and methods for accommodating synchronous access by users to data presented by a leader.

SUMMARY

The systems and methods described herein provide systems that set up a first network and an alternate failover network. The first network, in some embodiments, may be a star and hub network and may include nodes that connect directly to a server having the data. Nodes can request data from the server and the requests can be periodically made to synchronize data on the nodes. The system may have a second network that is a failover network. In some implementations the failover network is a mesh network. If a node on the first network determines that a request for data has failed, the node may issue a request for data across the failover network. The failover network may be a mesh network and in this implementation, the node on the mesh network can have an object data model that represents the state of an object data that the nodes are requesting to access.

In one implementation, each node that has an object data model broadcasts across the mesh network that it has an object data model and the state of that object data model. Typically this node is connected to the server through the first network. Nodes on the mesh network can receive the broadcast information and determine which nodes on the mesh network have the most recent object data model. Nodes with older object data models can request data from the nodes with the most recent object data model in order to update their older object data models. Alternatively, each node in a mesh network can check with other nodes in the mesh network, and all such nodes can continuously update their object data models to synchronize to any more recent object data models found on the mesh network. In some implementations, the data being transmitted synchronously through the network is slides in a slide presentation. In this implementation the object data model can include all the slides in the presentation and at least field indicating the slide currently being presented to the audience. A node can use the object data model to have the slide presented on that respective node be the slide that the most recent object data model indicates is the slide to present.

Typically, the nodes use the first star network to collect information from the server. If the server becomes over burdened with requests from multiple nodes, it may fail to connect to or fail to send data to a node, either at all or in a timely manner for synchronized presentation across the nodes. The node detects the failure and makes the request for the data through the failover network. In this way, in at least some implementations, the system provides synchronous content sharing between a server (a source device) and multiple nodes (user devices), even as resources such as bandwidth and processing power grow scarce. To this end, the systems and methods described herein provide an object data model that stores information regarding the shared content that is stored on the source device. A synchronization module on the source device synchronizes the object data model with an API server. User devices with a local object data model receive updates to the local object data model directly from the API server, or through at least one user device in a mesh network including several user devices. In general, updates to the local object data models are systematic and periodic.

BRIEF DESCRIPTION OF THE DRAWINGS

The characteristics and advantages of an exemplary embodiment are set out in more detail in the following description, made with reference to the accompanying drawings.

FIG. 5 depicts a schematic of a mesh network;

FIG. 6 depicts a schematic of an embodiment of the system described herein;

FIG. 7 depicts a schematic representation of an exemplary data model structure described herein;

DETAILED DESCRIPTION OF THE ILLUSTRATED EMBODIMENTS

Figure 1:
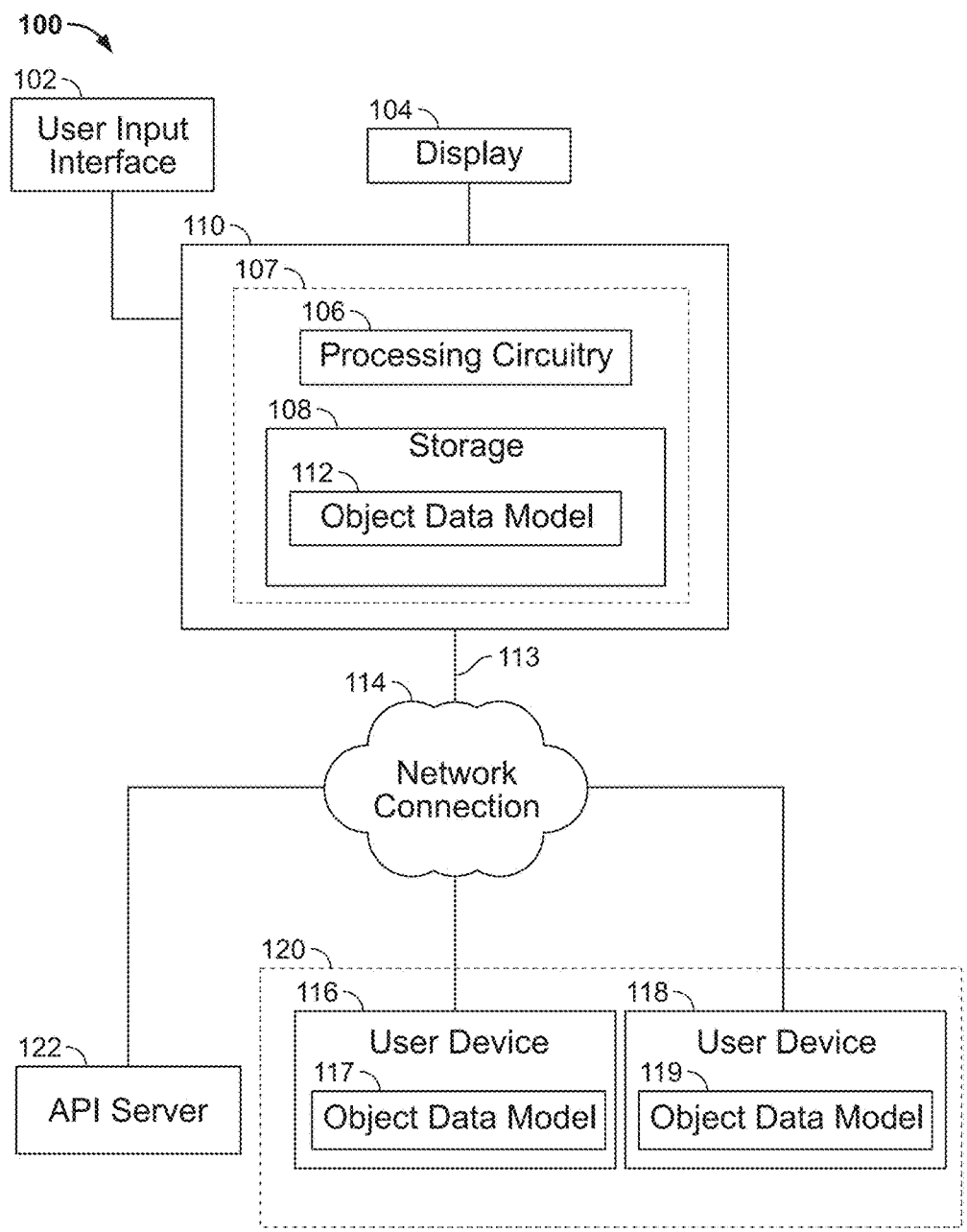
FIG. 1 depicts one embodiment of a system described herein.

Objects, advantages, and features of the exemplary embodiment described herein will be apparent to one skilled in the art from a consideration of this specification, including the attached drawings.

It is an object and feature of an exemplary embodiment described herein to provide a robust and reliable way of providing synchronized information to a large number of users. In some settings, multiple users may wish to access on their devices a media asset provided by a source device. For example, conference attendees with tablets may have access to the internet provided by the conference organizer or venue hosts, either through a cellular connection, 3G, 4G, Wi-Fi connection or otherwise. While a presenter talks, moves through slides, and annotates them, attendees may want to follow the presentation on their tablet, and want to be able to access the presenter's annotations. For example, doctors attending a medical conference may wish to access a set of slides which a presenter is using.

To provide an overall understanding of the systems and methods described herein, certain illustrative embodiments will now be described.

As referred to herein, data synchronization or synchronous content sharing means maintaining multiple instances or copies of a dataset in coherence with one another. Data synchronization may use source-synchronous clocking. Data synchronization may occur in real time and requires data extraction from a source, data transfer, data transformation and data loading at the target location. As referred to herein, synchronous or synchronously may be used interchangeably and mean occurring at the same time, or substantially the same time.

As referred to herein, an Application Program Interface (API) server is a set of routines, protocols, and tools for building software applications. The API server specifies how software components should interact and different APIs may be used when programming graphical user interface (GUI) components for different operating systems, applications or websites.

As referred to herein, a computing device means a content source device, and may be a server computing device, which may be located centrally or at distributed locations, and provides services to various types of users and devices connected via a network such as the Internet via network connection 207. The computing device may include a user equipment device, such as user computer equipment, or a wireless user communications device.

As referred to herein, the phrase "user equipment device," "user equipment," "user device," "electronic device," "electronic equipment," "media equipment device," or "media device" should be understood to encompass any device for accessing content, such as a digital storage device, a digital media receiver (DMR), a digital media adapter (DMA), a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a smart phone, or any other television equipment, computing equipment, or wireless device, and/or combination of the same. User equipment devices can be implemented as user computer equipment, wireless user communications device, or any other type of user equipment suitable for accessing content, such as a non-portable gaming machine. For simplicity, these devices may be referred to herein collectively as user equipment or user equipment devices. User equipment devices, on which an application may be implemented, may function as a standalone device or may be part of a network of devices. Various network configurations of devices may be implemented.

As referred to herein, an object data model includes an object based logical model: a data model based on object-oriented programming including objects and object identifiers. An object data model, also referred to as data model, may be an object oriented structure which may describe a wide range of media assets by storing different classes with different properties, and forming an organized hierarchy. Fields within the object data model may be set to describe the nature, status, or overall properties of a media asset. In the object data model an object has a state and a behavior.

The object data model may include fields used to synchronize the display of slides for users with the slides as displayed by the presenter. For example, the object data model may include structural information such as media asset identification, categories, headers, fields. The data model may include core information, such as number of slides or intended order of the slides, as well as temporal information, such as an active slide flag or an upcoming flag slide. Finally, the data model may include managing instructions on how to use data from the different data fields in the data model in conjunction with one another to determine the status of the media asset stored.

An object state may be a set of values for the attributes of the object. Each object is represented by an object data structure that includes a plurality of fields (attributes) into which is stored useful information that describes characteristics of the corresponding object. The fields (attributes) of a given object may be used to encapsulate data and/or link to software functionality and/or processes pertinent to the given object. For example, the fields of a given object may include a pointer to a data link mechanism that enables access to the data for the given object as is well known in the art. An object behavior is program code which operates on the state of the object, written in a general purpose programming language which manipulates the object's local instance variables and may send messages to other objects. An object data model may be stored in a database which may be stored locally or remotely.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

In the embodiment shown in FIG. 1, system 100 includes a computing device 110, control circuitry 107, processing circuitry 106, storage 108, an object data model 112, a user input interface 102, a display 104, a network connection 114, an API server 122, a user device 116 and a user device 118 in mesh network 120. In this embodiment, content is synchronously shared between the computing device 110 and the user devices 116 and 118.

In the embodiment of FIG. 1, a presenter using computing device 110 shares data, such as a set of slides generated for display on display 104. The computing device 110 may be a computer or tablet provided by the presenter, the conference organizers, or another party.

Display 104 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 104 may be HDTV-capable. In some embodiments, display 104 may be a 3D display, and the interactive media application and any suitable content may be displayed in 3D. A video card or graphics card may generate the output to the display 104.

The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 107. The video card may be integrated with the control circuitry 107. User devices 116 and 118 each include displays similar to display 104.

Computing device 110 runs a synchronization application and stores the object data model 112 which represents a state of a presentation generated for display on display 104. The synchronization application may be the content sharing software application referred to as the "application" in FIG. 3 below. Alternatively, the synchronization application on the computing device may be a variant of the application. The application may have the same layout on various different types of user equipment or may be tailored to the display capabilities of the user equipment. For example, on computing device 110, the application may be provided with different features or may be a web site accessed by a web browser. In another example, the application may be scaled down for wireless user devices.

The synchronization application may be implemented using any suitable architecture. For example, it may be a stand-alone application wholly-implemented on the computing device 110 and the user devices 116, 118. In such an approach, instructions of the application are stored locally and data for use by the application is downloaded on a periodic basis (e.g., from an out-of-band feed, from an Internet resource, or using another suitable approach). Control circuitry 107 may retrieve instructions of the application from storage 105 and process the instructions to generate any of the displays discussed herein. Based on the processed instructions, control circuitry 107 may determine what action to perform when input is received from input interface 102. For example, movement of a cursor on a display up/down may be indicated by the processed instructions when input interface 102 indicates that an up/down button was selected.

A state refers to all stored information, i.e., the contents of all memory locations, at a given instant in time and a current state of a data model refers to a current set of values for the attributes of the object data model.

For example, presentation information stored in object data model 112 may include data included by the presenter on the slides, with any associated formatting or effects. Presentation information in object data model 112 may also include information regarding the delivery of the presentation. For example, presentation information in object data model 112 may include the number of total slides, an indication of the time spent on each slide, an indication of the time marker at which the presenter moves forward in the slides, and fields to indicate whether certain animations are taking place, and at what time.

When the state of the presentation changes, for example when a presenter at computing device 110 uses the user input interface 102 to change slides in the presentation, control circuitry 107 and processing circuitry 106 update object data model 112 in the computing device 110.

Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 107 executes instructions for an application stored in memory (i.e., storage 105). Specifically, control circuitry 107 may be instructed by the application to perform the functions discussed above and below. For example, the application may provide instructions to control circuitry 107 to generate displays. In some implementations, any action performed by control circuitry 107 may be based on instructions received from the application. Control circuitry 107 described herein may be implemented using software running on one or more general purpose or specialized processors.

An application may be, for example, a stand-alone application. For example, an application may be implemented as software or a set of executable instructions which may be stored in storage, and executed by control circuitry of a user device. In some embodiments, applications may be client-server applications where only a client application resides on the user equipment device, and server application resides on a remote server. For example, applications may be implemented partially as a client application on control circuitry of a user equipment device and partially on a remote server as a server application running on control circuitry of the remote server. When executed by control circuitry of the remote server, the server application may instruct the control circuitry to generate the application displays and transmit the generated displays to the user equipment devices. When executed by control circuitry of the remote server, the application may instruct the control circuitry to transmit data for storage on the user equipment. The client application may instruct control circuitry of the receiving user equipment to generate the application displays.

The application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In FIG. 1, when the computing device object data model 112 is updated, the control circuitry 107 sends update information from the computing device 110, through network connection 114, to an API server 122. Update information includes presentation information retrieved by the synchronization application and stored in an object data model form. In an exemplary embodiment, the API server 122 is a remote server, and the one way synchronization between the computing device 110 and the API server 122 is performed at fixed time intervals. In an alternative embodiment, synchronization may be two-way synchronization, in the event that a backup may be retrieved from the API server 122 to restart a presentation at the last played position on computing device 110. Transfer of data from the computing device 110 to the API server 122 may be done via network connection 114 which may be a network server such as a Wi-Fi or cellular network.

A network connection such as network connection 114 may include communication paths which couple user equipment devices and the computing device directly or indirectly. The network connection may use one or more networks including the Internet, a radio communications network, a mobile phone network, mobile voice or data network (e.g., a 4G or LTE network), cable network, public switched telephone network, or other types of communications network or combinations of communications networks. Communication paths may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Communication paths may also include other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC.

Requests, commands and other suitable data may be sent using control circuitry. An input/output path may connect control circuitry to one or more communications paths.

In the embodiment of FIG. 1, as the presenter moves through a presentation or display of a media asset at computing device 110, the synchronization application updates the object data model to reflect the current state of the presentation, and periodically and frequently transfers updates from this source object data model to a remote API server. In an exemplary embodiment, the synchronization application may automatically store information on the status of the ongoing presentation or media display. In an alternative embodiment, a manual override may be used to update the information at the API server when requested by the presenter.

In turn, the API server 122 pushes updates down to user equipment devices 116 and 118 which store local object data models 117 and 119 respectively. To receive updates, user equipment devices request a star network connection with the API server 122 and when a connection is established, the API server pushes down updates to the local object data model. When no star network connection can be established with the API server 122 (e.g., connection failure or time out) each user equipment device requests a mesh network connection with at least one other user device. In the embodiment of FIG. 1, user device 116 and user device 118 are both part of mesh network 120. When user device 118 has established a star network connection with API server 122 but user device 116 has been unable to do so, user device 116 can connect via mesh network 120 to user device 118. Accordingly user device 116 can receive periodic updates to its local object data model updates from user device 118.

Figure 2:
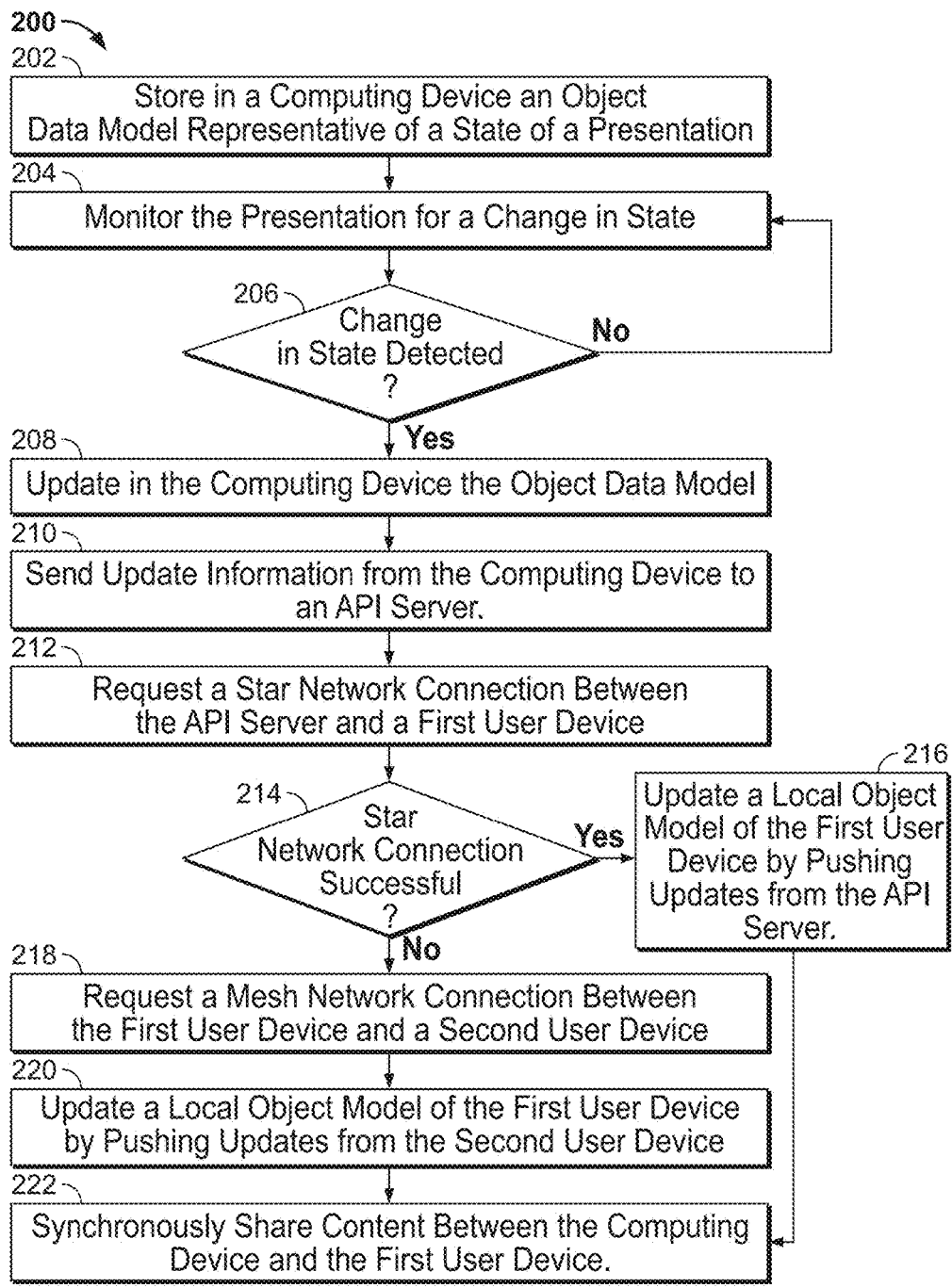
FIG. 2 depicts a flow chart diagram of one embodiment for synchronizing content described herein.

The method shown in FIG. 2 can be implemented with system 100 described in FIG. 1. Method 200 or any step thereof can be performed on, or provided by, any of the devices shown in FIG. 1. For example, process 200 may be executed by control circuitry 107. In FIG. 2, at step 202 an object data model representative of a state of a presentation is stored in computing device. At step 204 the method monitors the presentation for a change in state. At step 206 when a change in state is detected the method proceeds to step 208. When a change in state is not detected, the method returns to step 204 and continues monitoring the presentation for changes in state. At step 208, the method updates the object data model stored in the computing device. Updating the object data model requires a limited amount of data transfer, comprising only values of fields that have been updated, such as current slide number and slide status, thereby minimizing the load on the network used. At step 210, the method sends update information from the computing device to an API server (for example, API server 122 in FIG. 1). At step 212, the method requests a star network connection between the API server (for example, API server 122 in FIG. 1) and a first user device (for example, user device 116 in FIG. 1). At step 214, the method determines whether the star network connection was successful. When the star network connection was successful, the method proceeds to step 216, where updates are pushed from the API server to the first user device to update a local object data model (for example, object data model 117 in FIG. 1) of the first user device. When the star network connection was unsuccessful, the method proceeds to step 218, which requests a mesh network connection between the first user device and a second user device (for example, user device 118 in FIG. 1). At step 220 the method updates a local object data model of the user device by pushing updates from the second user device. At step 222, following either step 216 or steps 218 and 220, content is synchronously shared between the computing device (for example, computing device 110 in FIG. 1) and the first user device (for example user device 116 in FIG. 1).

Figure 3:
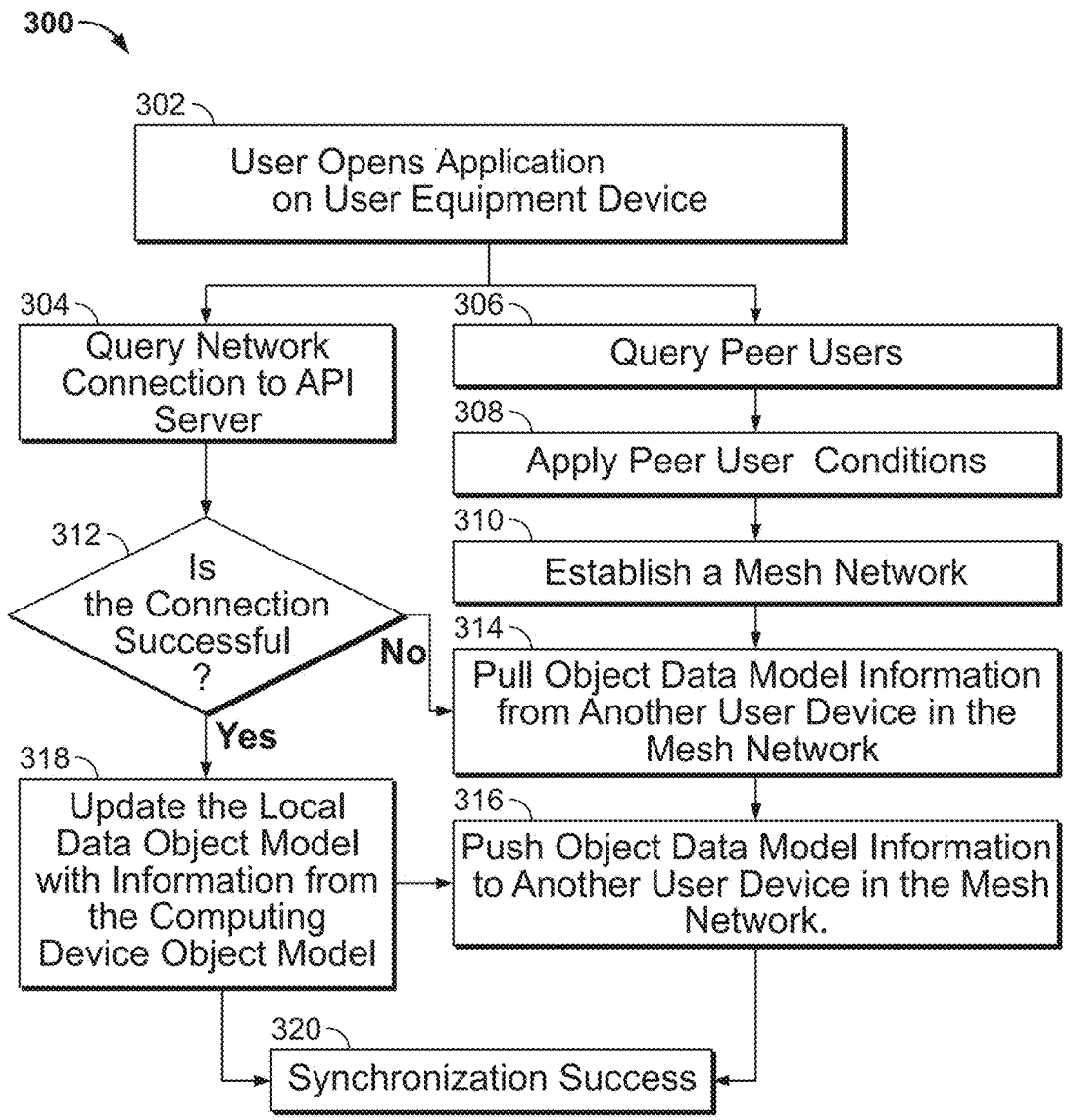
FIG. 3 depicts a flow chart diagram of one embodiment for synchronizing content described herein.

The method shown in FIG. 3 can be implemented from system 100 described in FIG. 1. Method 300 or any step thereof can be performed on, or provided by, any of the user devices shown in FIG. 1. In this embodiment, a user or conference attendee accesses a content sharing software application, referred to as the "application." The application can be loaded onto a user's tablet or computing device. In the embodiment of FIG. 1, the application is implemented on user devices 116, 118 and on computing device 110. The application may be a standalone application or a web browser plugin, which communicates with the computing device 110, as shown in FIG. 1. Conference provided tablets can be offered to conference attendees with the application already pre-loaded. Alternatively, attendees may download the application on their personal computer or tablet prior to the conference. The application may include data and data structures provided by API server 122 ahead of the presentation. The application allows users to follow along a presentation, synchronized with the presenter. The application may work with multiple operating systems. In an exemplary embodiment the software application may be inherent to the operating system.

At step 302, a user opens the application on a user device (for example, user device 116 in FIG. 1). A user, for example a conference attendee may download the application through an application aggregator, such as the Apple App Store. The application is available for operating systems iOS7 and higher, as well as Android platforms. In alternative embodiments, students can access lecture content, and users can access publicly available content through the presentation application.

Users with the application on their devices may open up the application when attending a conference, or when intending to access a specific content.

In the embodiment of FIG. 3, when a user opens the application, the application may first automatically attempt to scan for known star networks, and concurrently automatically query peers to create a mesh network. In the discovery phase, the application on a local user device identifies potential mesh peers by using criteria such as closeness, signal strength, preferences, or other factors. U.S. Pat. No. 7,277,950 incorporated herein describes mesh peer selection.

In the embodiment of FIG. 3, the application may include in memory at least an object data model for the media asset the user intends to access. For example, the application may include in memory at least an object data model for the presentation the user is attending. The application may obtain an object data model for a presentation based on user selection, or according to additional information such as conference schedule and user location. For example within the application, a user may select through an interface a conference type 'Medical', further select 'American Obstetrical Institute' and a date 'Day 1' to select the presentation 'Keynote Address.' For example, the user device may detect user location based on GPS information, or IP address.

After a user opens the application on a user device (for example, user device 116 in FIG. 1) at step 302, the application proceeds to step 304 and queries the network connection (for example, network connection 114 in FIG. 1) to determine if there is a connection between the user device and an API server (for example, API server 122 which has been updated with information regarding the object data model of computing device 110 in FIG. 1). At step 312, the application determines if the connection is a success. When the connection is a success, the application proceeds to step 318. At step 318 the application updates the local object data model for the user device with information from the object data model of the source device.

When a user device is unable to query the API server, it may query users in the pre-established peer network, as described below. When the application determines at step 312 that the connection is a failure (for example, failure of the star network connection between user device 116 and API server 122 in FIG. 1), the application proceeds to step 314. When a user connection through the star network fails, the network stack returns an exception indicating that the network is not available as a transport layer that can be used for requesting data. Once such a network request fails, the network stack returns an exception. The application receives that exception. A connection may be a technical failure when after a finite amount of time no connection has been established or a connection is determined to be insufficient to support the desired data transfer operations. For example, a connection may be a failure when no network available, there is no route to host, a bad gateway, access points overload, inability to generate an IP address, inability to meet safety protocols, or a timeout resulting from a slow bandwidth. In the event that the nature of the actual technical failure is unknown, the application may still act on that failure by accessing the mesh network to make its next request. In response to a failover event, a request may be made on the mesh network for the next slide in the presentation.

In the embodiment shown in FIG. 3, the application may transition to the mesh network to maintain synchronous delivery of content to the user. As noted above, a request to connect to the server may fail due to there being no network available, no route to host, a bad gateway, access points overload, inability to generate an IP address, inability to meet safety protocols, or timeout resulting from a slow bandwidth. In the event that the nature of the actual technical failure is unknown, the application may still act on that failure by accessing the mesh network to make its next request.

When a device is unable to find a responsive peer in the network with the appropriate object data model, the device continues to query the peers in its mesh network. Similarly, every user device may query peers in its respective mesh network. When every user device is querying peers and some peers are connected to the API server, the initial query user will eventually, after a finite period of time and a finite number of hops, obtain the update information to update its object data model. In an exemplary embodiment, a user may query peers within its immediate mesh network every 30 seconds. Once a user receives the updated object data model, the application propagates the object data model to peers within its immediate mesh network.

The application may perform step 306 in parallel with step 304. At step 306 the application queries peer users. At step 308, the application applies peer user conditions. At step 30, the application establishes a mesh network by connecting to peer users according to peer user conditions. For example, each user may set preferences regarding the type of network the characteristics of users it will accept within its mesh network. Some users or user devices may screen members of mesh networks based on IP address, name, storage space, or any other combination of characteristics. The application may also restrict the type of application users selected for a mesh network by requiring that the selected peers have the object data model associated with the ongoing presentation. The application also ensures that peers are sharing the same presentation. The application may perform a check during peer negotiation that all peers have a common object data model specific to a shared presentation, for example as determined by a document ID field. A check for a shared object data model to be used minimizes interferences between presentation data being broadcasted by mesh network nodes in different conference rooms which may be adjacent.

Any device on a mesh network gets the updated object presentation model. Once a connection is established as determined at step 312, each user device may automatically and periodically broadcast its local version of the object data model to peer users and to the network. Each user device running the application compares its local and current object data model to the most recently received object data model for the ongoing presentation. To compare the local and current object data model, a user device may check each field in the object data model. When a field in the object data model has a different value in the local object data model and in the current object data model, this indicates that the local object data model is not current and an update is required.

Periodic occurrences such as periodic broadcasts, periodic pushes or pulls of update information may be occurrences which take place repeatedly at fixed and equal time intervals. These time intervals or a corresponding frequency of occurrence may be automatically set by the system or a device, or set by the user. For example, periodic broadcasts described above may take place every second, every 30 seconds, or every 2 minutes.

As described above, based on the object data model comparison, each peer user device may determine whether they need to update the local object data model. For example, a user device can make a request on the mesh network for the URI or new slide it needs to be consistent with the newest version of the object presentation model. In this embodiment, each user device connected to the computing device may execute a series of push and pull instructions, configured to broadcast or receive updates to the object data model. Accordingly, each user device may periodically receive from the computing device of the presenter an update to its local object data model, transferred via the API server either directly to the user device, or through a peer in a local mesh network.

Updating the object data model requires a limited amount of data transfer, comprising only values of fields that have been updated, such as current slide number and slide status, thereby minimizing the load on the network used. For example, the only data required by a peer may be the value of the field in the object data model indicating the current slide number, URI or the ID for the current slide.

In some embodiments, an application client residing on the user's equipment send requests to obtain data when needed, e.g., when updates are required or when the user equipment device receives a request from the user to receive data. Updates may be provided to the user equipment with any suitable frequency (e.g., continuously, daily, a user-specified period of time, a system-specified period of time, in response to a request from user equipment, etc.). The frequency may be automatically set, or set by the user.

At step 314, the application pulls object data model information from another user. device in the mesh network (for example user device 118 in mesh network 120 in FIG. 1). At step 316, the application pushes object data model information to another user device in the mesh network (for example user device 117 in FIG. 1 can push updated object data model information to another user device in the mesh network). At step 320, synchronization is a success, with information being synchronously shared between the user device and a computing device, either via an API server star network connection, or via a mesh network connection.

With the application implemented on system 100 in FIG. 1, when a presenter using computing device 110 to generate for display a presentation on display 104 changes slide, the slide displayed on the user device for a synchronized user device changes. A group of remote users may also receive synched audio data through the application. In addition, with the application a presenter and users may annotate each slide with text or figures. In an exemplary embodiment, users may bookmark slides, and submit comments. In the embodiment of FIG. 1, a user can draw on a touch screen tablet a schematic, or type an annotation, which is saved with the slide presented at the time of the annotation. Comments may be shared with the presenter, a specific user, or groups of users, or saved for future reference. For example, the presenter can engage with the audience by requesting feedback. Users may save their annotated slide set for future reference. U.S. Pat. No. 7,373,590, incorporated by reference describes a slide annotation application.

Figure 4:
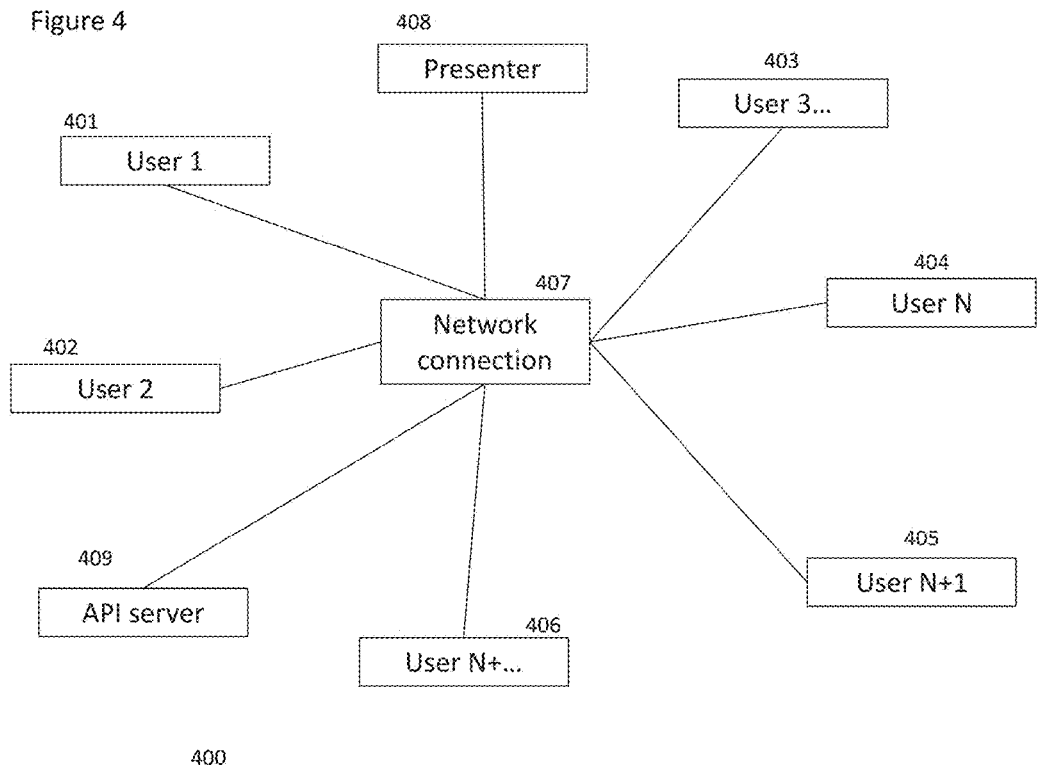
FIG. 4 depicts a schematic of a star network.

FIG. 4 depicts a schematic of a star network 400 in which network hub 407 is in direct communication with a number of nodes 401-406 (users 1, 2, 3, N, N+1, and N+ . . . ). The direct connections between hub 407 and nodes 401-406 are referred to herein as a one-hop communication. For example, User 1 (401) is one-hop removed from the Network connection (407), which itself is only one-hop removed from an API server (409).

As referred to herein, a star network is a local area network (LAN) in which all nodes (user equipment devices, any other devices) are directly connected to a common central computer, e.g., the computing device. Every user equipment device is indirectly connected to every other user equipment device through the central computing device. In some embodiments, the computing device can also operate as a user equipment device.

In some embodiments, a request for a star network connection may be automatic or transparent to the user. In alternative embodiments, the request for the star network connection may require user input. Requests may be sent from a user equipment device to a server remote from the user equipment device.

FIG. 5 depicts a schematic of a mesh network 500 which includes both star network properties, and mesh network properties. A mesh network may be a local area network (LAN) that employs one of two connection arrangements, full mesh topology or partial mesh topology. A mesh network topology is a decentralized design in which each node on the network connects to at least two other nodes such that there is no single point of network failure. As referred to herein, a network failure may be at least one of request time out, bad gateway, and a no host error. If one node can no longer operate, the rest of the nodes can still communicate with each other, directly or through one or more intermediate nodes. In a full mesh topology, each network node is connected to all the other nodes in the network. In a partial mesh topology, at least one node connects directly to every other node while others may only connect to those nodes they exchange data with on a frequent basis.

Users may access the media asset through a star network by connecting their devices to the remote API server via a standard internet connection, Wi-Fi, or cellular. As shown in FIG. 5, User 2 (502) may connect to the API server via the hub network connection. Similarly, User 3 (503) in FIG. 5 may access the API server through a one-hop connection. The presenter or source device in FIG. 5 may also upload to the API server through a one-hop connection via the hub network, as shown in the embodiment of FIG. 1. Alternatively, the presenting device or computing device is not part of a mesh network. Instead, the computing device is connected to the API server via a star-type network, such as a Wi-Fi network. In an alternative embodiment, the computing device may be connected to other devices through mesh-type networks.

Once open, for example at step 302 of FIG. 3, the application may automatically search for available networks, both so-called star networks such as a Wi-Fi networks or cellular networks; and peer based so-called mesh networks. In an alternative embodiment, a user may set preferences regarding the type of network and in the case of a mesh network, the characteristics of users it will accept within its mesh network. When a user device is part of a system as shown in FIG. 5, which includes both a star network, and multiple overlapping mesh networks, User 3 is a part of the star network, having a direct one-hop connection to the API server. User 3 is also a part of a first mesh network including Users 1, 2 and 3, and User 3 is part of a mesh network including Users 3, N, N+1 and N+ . . . .

As shown in FIG. 5, users 503-506 are nodes which are in communication with each other within a mesh network. The direct connection between node 501 and 502 or between 503 and 505 is also referred to as a one-hop connection. The indirect connection between nodes 502 and 506 is referred to as a two-hop connection, and connections can include more than two hops. As shown in FIG. 5, some users, such as User 3 (503) may be connected both directly to the network connection (507) and to users not directly connected to the network (504-506). For example, User N (504) is connected to the network connection through User 3 (503) or a chain of users (506, 505, 503) to the network connection (507). Users may access the media asset through a star network by connecting their devices to the remote API server via a standard internet connection, Wi-Fi, or cellular. User 2 (202) may connect to the API server via the hub network connection. Similarly, User 3 (203) in FIG. 5 may access the API server through a one-hop connection. The presenter or source device in FIG. 5 (for example computing device 110 in FIG. 1) may also upload to the API server through a one-hop connection via the hub network.

FIG. 6 depicts a schematic of an embodiment of the system where both a star network and a mesh network may coexist. Conference attendees with tablets may have access to the internet provided by the conference organizer or venue hosts, either through a cellular connection, 3G, 4G, Wi-Fi connection or otherwise, and are therefore able to directly connect to the same server as the presenter. Through a one-hop connection to the server, conference attendees may receive synchronized data from the presenter. In the embodiment shown in FIG. 6, Users 1, N and N+1 (601, 605 and 604) may be part of a mesh network, whereas User N+ (606) may be connected to the network (607) through a star structure. In FIG. 6, the Application Server (609) may be connected to the network through this star structure. A presenter (608) may have a computing device directly connected to the Network (607), and the computing device may include or interact with both an automator or synchronization tool (610) and a manual override tool or option (611).

FIG. 7 depicts a schematic representation of an exemplary data model structure. As shown in FIG. 7 the data structure may include structure metadata (e.g. F1 in FIG. 6), such as title, version, date, etc. For example, as shown in FIG. 7, F1 includes an ID field, along with an attributes field, which may further include, theme, location and summary, for example. The data structure may also include attribute metadata, such as name, description, data type, variable type, number type, criteria. For example, as shown in FIG. 7, the data structure includes fields such as current slide, speaker or moderator. Finally, the data structure may also include data and flag arrays for each attribute. For example, in FIG. 7, block F2 includes data or flag values to the attributes. For example, the field 'Number' is associated with the attribute 'CurrentSlide' and the attribute 'hasSlides' is associated with the flag 'boolean'.

Figure 8:
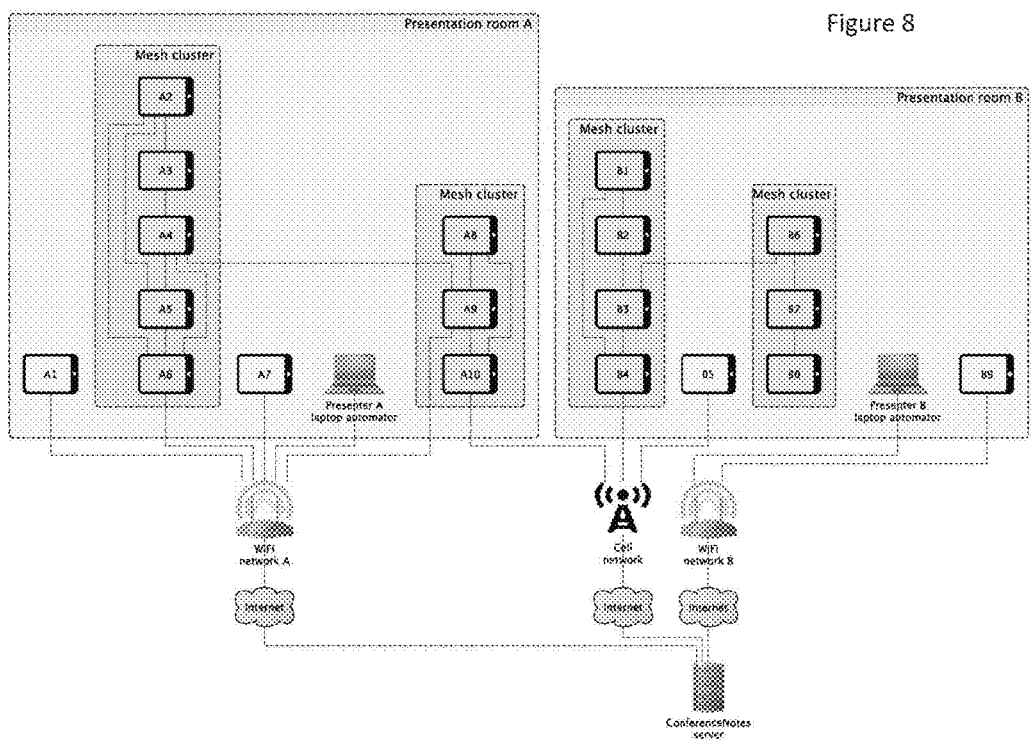
FIG. 8 depicts a schematic of an exemplary embodiment of the system described herein.

FIG. 8 depicts a schematic of an exemplary embodiment of the system. In this embodiment, at a conference center, or in a school setting, presentations may take place in nearby or adjacent locations. A first presenter, Presenter A may give a presentation in presentation room A, whereas next door, presenter B may give a presentation in presentation room B. As shown in FIG. 6, each presenter may use a computer with an automator, and may communicate through a Wi-Fi network to the internet. For example, Presenter A, and participants in room A use Wi-Fi network A, whereas Presenter B, and participants in room B may use Wi-Fi network B. Alternatively, participants may also connect to the internet via a cell network. In an exemplary embodiment, access to the internet provides access to the ConferenceNotes server.

As shown in the exemplary embodiment of FIG. 8, participant devices may be connected directly to the Wi-Fi network, such as A1, A6, A7 and A9. For example A1 and A7 are only connected to the Wi-Fi network, and not to other devices. In contrast, device A6 is connected to Wi-Fi network A, but is also simultaneously connected to devices within a mesh cluster comprising devices A5, A4, A3 and A2. Device A4 is indirectly connected to the Wi-Fi network A through devices A5 and A6. Furthermore, some devices may be connected to multiple clusters. For example, user device A4 shown in FIG. 6 is part of a first mesh cluster (A2-A6), and part of a second mesh cluster (A8-A10).

As shown in FIG. 8, connections in adjacent rooms, such as presentation room B, may function in a similar manner, with devices such as B5 connected directly to the internet, through the cell network in the case of B5, or through Wi-Fi, in the case of B9. In addition, connections may also be established directly and/or indirectly through other devices within a mesh. Clusters may communicate through bridge devices. For example, in presentation room B, devices B6 and B3, located in distinct clusters, may communicate.

In an exemplary embodiment, there is no communication between users in presentation room A and in presentation room B. In an alternative embodiment, users may connect with mesh networks in a different location. For example, a conference having several identical sessions for a same presentation may allow users located in different sessions to connect.

In an exemplary embodiment, the application may establish a mesh network without any indication to the user of the mesh build up process. In an alternative embodiment, the application may request the user to select whether the device will query peers to create a mesh network, and whether the user device itself will be available for outside requests to join mesh networks.

In determining which users may qualify as active peers within a mesh network, factors such as randomness, preferences, system resources and past user history may be under consideration. In an exemplary embodiment, the application on a user device may maintain a list of peer devices located within the established local network. This peer device list may be stored in a database on a memory of the user device. In an alternative embodiment, the peer device list may be stored remotely. The peer device may be periodically updated to reflect whether peers have recently entered or exited the pool of available peers for local mesh network selection.

In an exemplary embodiment, a device may be a participant in multiple mesh networks. A mesh network may be an aggregate of smaller local mesh networks, with the smaller mesh networks overlapping by at least one device. In an exemplary embodiment, a local mesh network may include between three and eight devices. In a preferred exemplary embodiment, a local mesh network may include four devices to minimize bandwidth overhead. In an exemplary embodiment, as many as four hundred devices or greater may be connected.

In an exemplary embodiment, considerations of media asset size and network efficiency may determine the means through which information is disseminated between users. For example, media assets may be transferred between peers of a local mesh network, through a one-hop process, whereas synchronization indicators stored in the object data model, such as number of the currently active slide, may be transferred through one-hop or multiple hop processes, since the transfer requires less resources.

Push and pull processes, together with pinging of peer devices may become a load on the server. Minimizing the amount of information transfer required to synchronize users with the source device, through the user of the object data model optimizes the use of the mesh network. In an exemplary embodiment, pull requests are performed in a synchronized way across all user devices. In an exemplary embodiment, as noted above, in the event of a failure to connect, the system provides a failover synchronization between devices, which may be a peer to peer synchronization using peer devices accessible within pre-established mesh networks.

In an exemplary embodiment, while a presenter device streams a media asset such as a presentation, the synchronization tool on the source device periodically updates its object data model to reflect the state of the presentation, and uploads it to the remote API server through a star network. User devices connected to the network periodically query the API server through the star network and update their local object data models.

In the event of a conflict between multiple peers in a mesh network or between peers in the mesh network, the values of the fields stored in the current object data model on the API server prevail.

Figure 9:
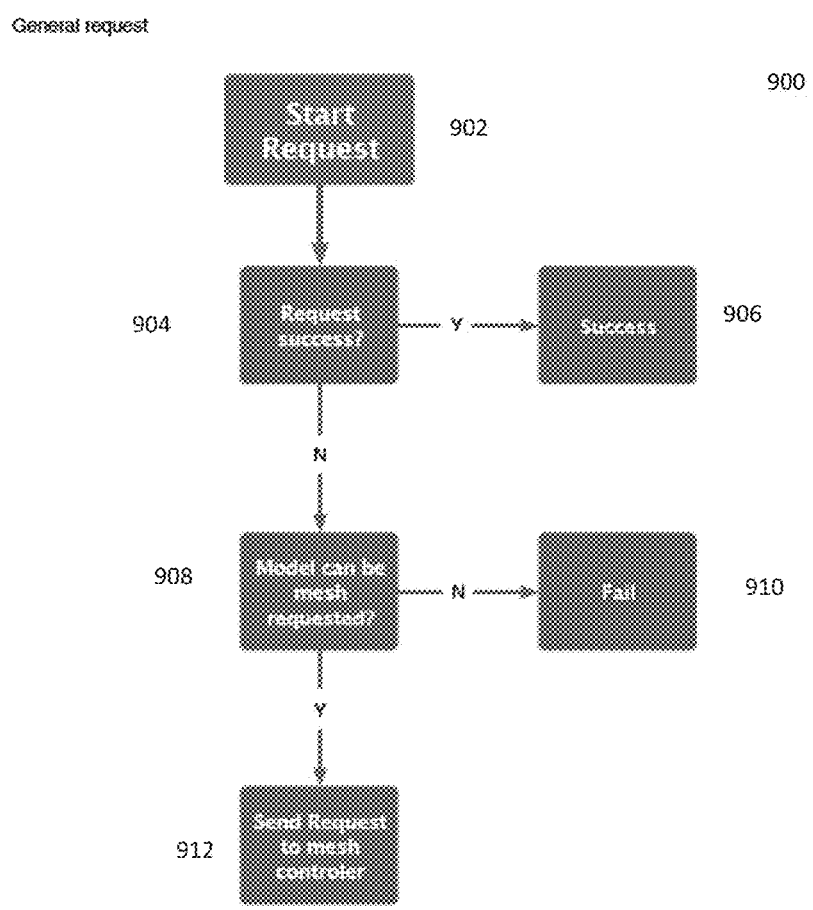
FIG. 9 depicts steps for a general request for an object data model according to an exemplary embodiment described herein.

FIG. 9 depicts steps for a general request for an object data model according to an exemplary embodiment. At step 902, a user device initiates a request for a data structure or data model. At step 904 the user device determines the status of the request (904), which is either a success (906) or a failure. In the event of a request failure, the user device proceeds to step 908 and queries whether the data model may be obtained through a mesh (908), leading either to a determination that the data model is not available via mesh (910), or leading to a request being sent to the mesh controller (912).

Figure 10:
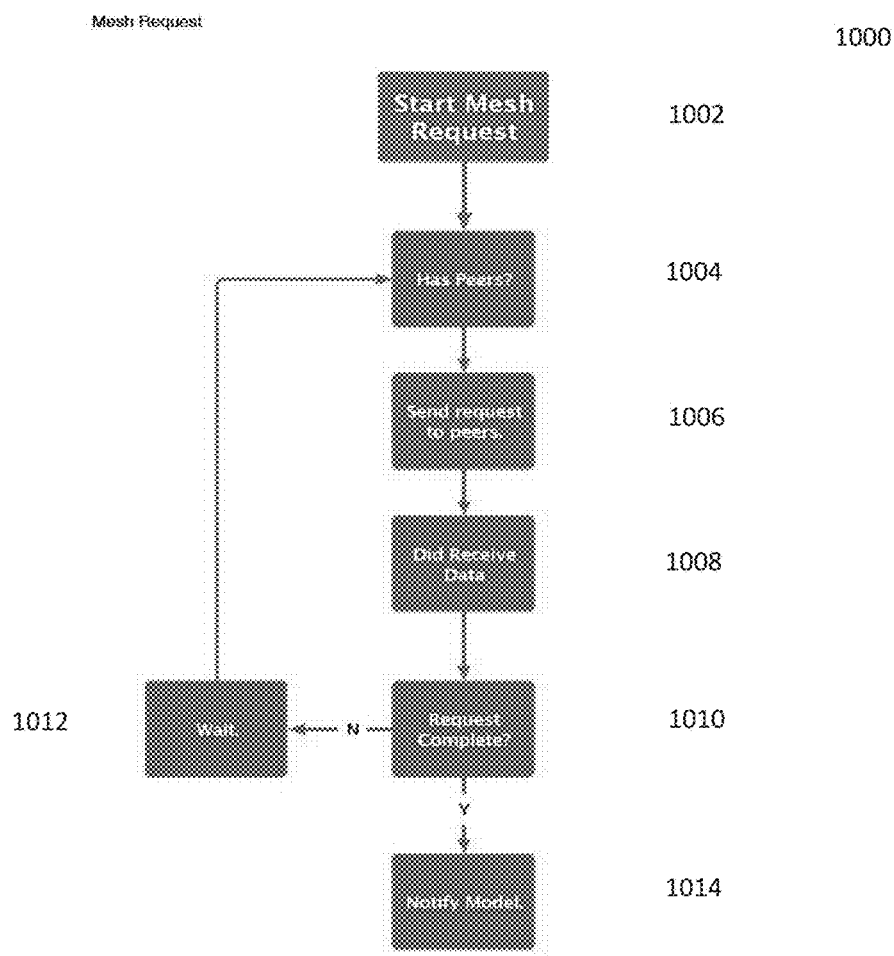
FIG. 10 depicts steps for an object data model request from a mesh network according to an exemplary embodiment described herein.

FIG. 10 depicts steps for an object data model request from a mesh network according to an exemplary embodiment. Once a mesh request is initiated at step 1002, at step 1004 a check is performed by the user device to determine whether the user has peers, in which case the data model request may be sent to peers (step 1006). In the embodiment of FIG. 10, once data is received from the peers at step 1008, a check is performed by the user device to determine whether the request is complete (step 1010). In the event that the request is complete, the local data model is notified at step 1014. In a non-limiting embodiment, notification of the local data model includes an updated of the fields in the local data model, which may be replaced with data obtained from the data model received from peer devices. In the event that the request at step 1010 is determined to not be complete, a wait time may be built in at step 1012 before returning to step 802 to perform a new check and determine whether peers are available.

Figure 11:
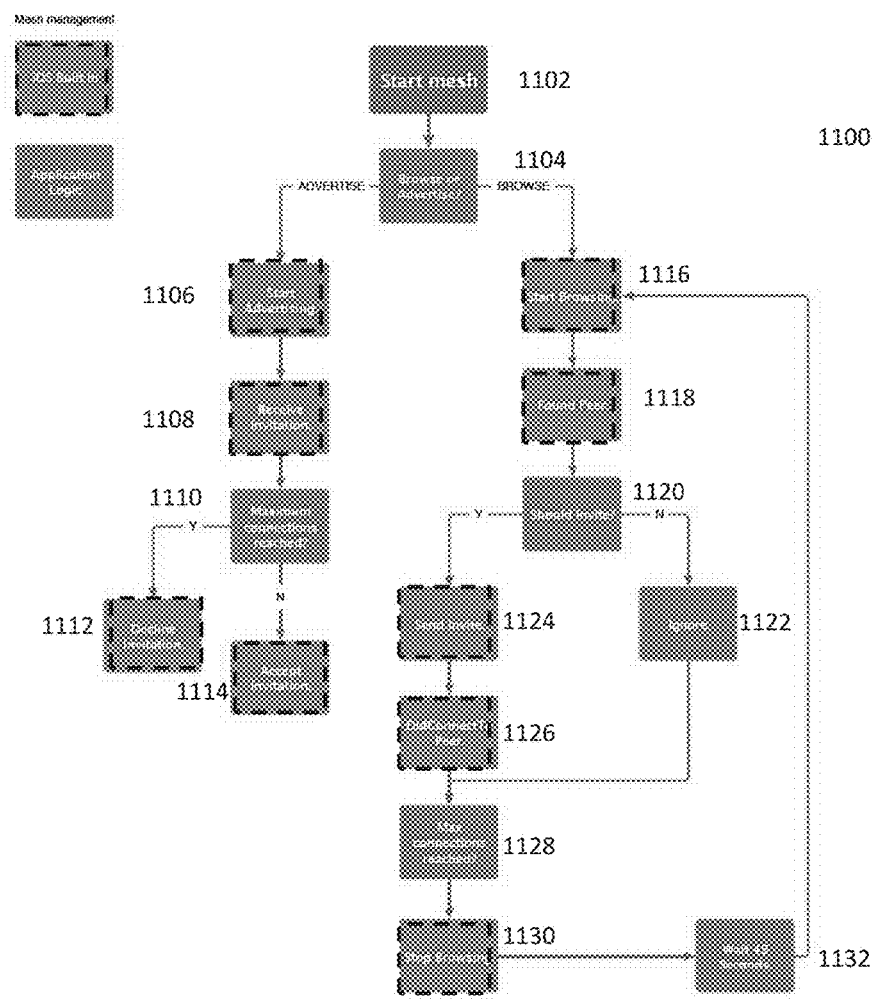
FIG. 11 depicts steps for a mesh management scheme according to an exemplary embodiment described herein.

FIG. 11 depicts steps for a mesh management scheme according to an exemplary embodiment. In the embodiment of FIG. 11, an iOS meshing framework may enable users to start advertising at step 1106 and receive an invitation (step 1108) to a mesh network.

Alternatively, an iOS meshing framework may enable users to start browsing at step 1116 and at step 1118, determine whether peers are found. An iOS meshing framework may also, in a non-limiting embodiment, allow users to accept or decline invitations (steps 1112 and 1114), to send invites (steps 1124) and to check the connection status with peers (step 1126), as well as providing an end to the browsing for peer devices (step 1130). Alternatively, the application may make the decision to start a mesh network (step 1102) and decide whether the user device on which the application is running will browse or advertise for updates (step 1104).

For example, a user device which is determined to not have performed an update of the object data model for a relatively long period of time may be selected to advertise, e.g. to circulate a request to join a mesh network to obtain the opportunity to update its local data structure. Alternatively, if a user sets a preference setting to have manual control over the formation of mesh networks, a user device may be selected to browse for peers. In an exemplary embodiment, the application may display a list of available peers. Available peers may be ranked based on a set of criteria such as proximity, signal strength, or past history.

As shown in FIG. 11, once an invitation is received by a device, the application may determine whether the maximum of connections established between the user device and other devices in the mesh is reached (step 1110) and either accept invitations at step 1114 or decline invitations at step 1112. Alternatively, once at least one peer has been found at step 1118, the application may make a determination at step 1120 of whether or not an invite should be sent to the detected peer. At step 1122, the application may make a determination to ignore the detected peer. At step 1128, the application may also determine whether a maximum number of connections between the user device and peer devices have been reached. In the event that the number of connections is reached, and the iOS structure determines to stop browsing at step 1130, the application may set conditions for starting to browse peers again. In the embodiment of FIG. 11, the application may include a wait period, such as 20-50 seconds at step 1132 before returning to step 1116 to browse.

The invention claimed is:

1. A method for synchronous content sharing, including:
storing in a computing device an object data model representative of a state of a presentation;
updating in the computing device the object data model in response to a change in the state of the presentation;
through a network connection, sending update information from the computing device to an API server;
receiving, at a user device, updates to a local object data model stored at the user device;
requesting a star network connection between the user device and the API server;
updating the local object data model by periodically pushing updates to the local object data model from the API server to the user device;
requesting a mesh network connection between the user device and at least one other user device;
when the star network connection fails, updating the local object data model by periodically pushing updates to the local object data model from the at least one other user device in the mesh network,
wherein content in the computing device is synchronously shared with the user device,
wherein the object data model includes at least an identification field to identify a media which is being synchronized, and an active media element field to identify the element currently displayed by the computing device.

2. The method of claim 1, wherein a star network failure is defined by at least one of request time out, bad gateway, and a no host error.

3. The method of claim 1, wherein pushing from the API server is performed for all user devices connected via the star network.

4. The method of claim 1, wherein pushing of updates is done every 30 to 50 seconds.

5. The method of claim 1, wherein requesting a mesh network connection is transparent to a user at the user device.

6. A system for synchronous content sharing, including:
a computing device comprising a memory configured to store an object data model representative of a state of a presentation; and
an API server communicatively coupled with the computing device through a network connection;
the computing device including processing circuitry and control circuitry, the control circuitry including instructions that when executed by the processing circuitry causes the processing circuitry to:
update, in the computing device, the object data model in response to a change in the state of the presentation;
send, through the network connection, update information from the computing device to the API server;
submit, to a user device, updates to a local object data model stored at the user device;
request a star network connection between the user device and the API server;
update the local object data model by periodically pushing updates to the local object data model from the API server to the user device;
request a mesh network connection between the user device and at least one other user device; and
update, when the star network connection fails, the local object data model by periodically pushing updates to the local object data model from the at least one other user device in the mesh network,
wherein content in the computing device is synchronously shared with the user device,
wherein the object data model includes at least an identification field to identify a media which is being synchronized, and an active media element field to identify the element currently displayed by the computing device.

7. The system of claim 6, wherein a star network failure is defined by at least one of request time out, bad gateway, and a no host error.

8. The system of claim 6, wherein pushing from the API server is performed for all user devices connected via the star network.

9. The system of claim 6, wherein pushing of updates is done every 30 to 50 seconds.

10. The system of claim 6, wherein the request for a mesh network connection is transparent to a user at the user device.

11. A method for controlling user devices in a wireless mesh network, including:
storing in a computing device an object data model representative of a model of a state of a presentation;
updating in the computing device the object data model in response to a change in the state of the presentation;
through a network connection, sending update information from the computing device to an API server;
receiving, at a user device, updates to a local object data model stored at the user device;
requesting a wireless star network connection between the user device and the API server;
updating the local object data model by periodically pushing updates to the local object data model from the API server to the user device;
requesting a wireless mesh network connection between the user device and at least one other user device;
when the star network connection fails, updating the local object data model by periodically pushing updates to the local object data model from the at least one other user device in the wireless mesh network,
wherein content in the computing device is synchronously shared with the user device,
wherein the object data model includes at least an identification field to identify a media which is being synchronized, and an active media element field to identify the element currently displayed by the computing device.

12. The method of claim 11, wherein a star network failure is defined by at least one of request time out, bad gateway, and a no host error.

13. The method of claim 11, wherein pushing from the API server is performed for all user devices connected via the star network.

14. The method of claim 11, wherein pushing of updates is done every 30 to 50 seconds.

15. The method of claim 11, wherein the request for a mesh network connection is transparent to a user at the user device.

16. A method for updating content of a user device in a wireless mesh network, including:
- receiving, at the user device, updates to a local object data model stored at the user device;
- requesting a wireless star network connection between the user device and an API server;
- updating the local object data model through the star network, by periodically pulling updates to the local object data model from an object data model of the API server to the user device, wherein the object data model of the API server represents a model of a state of a presentation at a computing device;
- requesting a wireless mesh network connection between the user device and at least one other user device;
- when the star network connection fails, updating the local object data model by periodically pulling updates to the local object data model from the at least one other user device in the wireless mesh network,
- wherein content is synchronously shared between the computing device, the user device, and the at least one other user device,
- wherein the object data model includes at least an identification field to identify a media which is being synchronized, and an active media element field to identify the element currently displayed by the computing device.

17. The method of claim 16, wherein pulling from the at least one other user device is performed by all user devices connected via the mesh network.

* * * * *